US009928153B2

(12) United States Patent
Dixon et al.

(10) Patent No.: US 9,928,153 B2
(45) Date of Patent: Mar. 27, 2018

(54) DETERMINING WHERE BOTTLENECKS OCCUR IN MULTI-THREADED MULTI-PATH COMPUTING SYSTEMS

(71) Applicant: International Business Machines Corporation, Armonk, NY (US)

(72) Inventors: Scot W. Dixon, Manning (AU); Steven Larcombe, Victoria Park (AU)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/937,111

(22) Filed: Nov. 10, 2015

(65) Prior Publication Data

US 2017/0132107 A1 May 11, 2017

(51) Int. Cl.
| | |
|---|---|
| *G06F 15/16* | (2006.01) |
| *G06F 11/34* | (2006.01) |
| *G06F 11/30* | (2006.01) |

(52) U.S. Cl.
CPC ...... *G06F 11/3433* (2013.01); *G06F 11/3024* (2013.01)

(58) Field of Classification Search
USPC ....... 709/203, 206, 217, 219, 223, 224, 226, 709/228, 231, 232, 238; 705/2, 7.29, 705/14.49; 726/23; 370/236, 401
See application file for complete search history.

(56) References Cited

U.S. PATENT DOCUMENTS

| | | | |
|---|---|---|---|
| 8,214,495 B2 | 7/2012 | Alon et al. | |
| 8,756,310 B2 | 6/2014 | Agarwala et al. | |
| 8,850,435 B2 | 9/2014 | Kanemasa | |
| 9,450,849 B1* | 9/2016 | Goldberg | H04L 43/0876 |
| 9,509,643 B1* | 11/2016 | Gade | H04L 51/00 |
| 9,626,275 B1* | 4/2017 | Hitchcock | G06F 11/3006 |
| 9,634,920 B1* | 4/2017 | Goldberg | H04L 43/10 |
| 9,684,524 B1* | 6/2017 | Porter | G06F 9/44505 |
| 2003/0018494 A1* | 1/2003 | Bronstein | G06Q 10/10 705/2 |
| 2007/0201370 A1* | 8/2007 | Stamoulis | H04W 72/1252 370/236 |
| 2008/0168559 A1* | 7/2008 | Touitou | H04L 63/0236 726/23 |
| 2008/0240128 A1* | 10/2008 | Elrod | H04L 12/64 370/401 |

(Continued)

FOREIGN PATENT DOCUMENTS

WO 2013072232 A1 5/2013

OTHER PUBLICATIONS

Yao et al., "Bottleneck Detection and Solution Recommendation for Cloud-Based Multi-Tier Application", ICSOC 2014, LNCS 8831, pp. 470-477, 2014, © Springer-Verlag Berlin Heidelberg 2014.

(Continued)

*Primary Examiner* — Quang N Nguyen
(74) *Attorney, Agent, or Firm* — Adolph C. Bohnstedt (57) ABSTRACT

One or more processors analyze interaction data for two or more nodes within a plurality of nodes processing a computing transaction. One or more processors determine a number of inbound requests and a number of outbound requests for the two or more nodes within the plurality of nodes. One or more processors determine whether one or more nodes within the plurality of nodes are limiting computing performance.

11 Claims, 6 Drawing Sheets

(56) References Cited

U.S. PATENT DOCUMENTS

2009/0287813 A1* 11/2009 Yibin ................. H04L 41/12
                                                        709/224
2013/0325598 A1* 12/2013 Shao .................. G06Q 30/02
                                                        705/14.49
2015/0032884 A1    1/2015 Greifeneder et al.
2016/0035046 A1* 2/2016 Gupta ................. G06Q 50/01
                                                        705/7.29

OTHER PUBLICATIONS

"Multi-Tier Application Performance", CA Application Delivery Analysis, Printed on: Aug. 12, 2015, Copyright © 2015 CA, 3 pages, <https://wiki.ca.com/display/CADA102/Multi-Tier+Application+Performance#>.

* cited by examiner

DETERMINING WHERE BOTTLENECKS OCCUR IN MULTI-THREADED MULTI-PATH COMPUTING SYSTEMS

BACKGROUND OF THE INVENTION

The present invention relates generally to the field of application performance management (APM), and more particularly to determining where bottlenecks occur along transaction pathways.

APM is focused on monitoring applications and application environments to determine application health and efficiency. APM is used to monitor and predict performance issues and other application problems either in the application or in the environment in which the application runs.

APM software collects many metrics from the application environment including central processing unit (CPU) usage, memory usage, transaction, latency, transaction rates, interaction data (correlation data), response times, thread pool usage, garbage collection (GC) activity, etc. Large amounts of data are collected from many complex application environments. More and more software vendors and customers are focusing on analytics to uncover insights from the available application performance data.

When transaction response time is identified as excessive, APM attempts to isolate the cause or at least provide users with an indication or "best guess" as to the probable cause and where to focus on a problem resolution.

SUMMARY

Embodiments of the present invention provide a method, system, and program product to determine where bottlenecks occur in multi-threaded multi-path computing systems. One or more processors analyze interaction data for two or more nodes within a plurality of nodes processing a computing transaction. One or more processors determine a number of inbound requests and a number of outbound requests for the two or more nodes within the plurality of nodes. One or more processors determine whether one or more nodes within the plurality of nodes are limiting computing performance.

DETAILED DESCRIPTION

Embodiments of the present invention recognize that slow response times in a multi-threaded multi-path computing environment are often caused by one or more bottlenecks involving one or more nodes in the computing system. Embodiments of the present invention provide a method, system, and program product for analyzing inbound and outbound calls at nodes in a multi-threaded multi-path computing environment and determining whether one or more nodes are causing a slow response time.

In a complex multi-threaded multi-path computing environment, where a transaction is distributed across multiple domains and the interactions between the domains occur in parallel, it is difficult to determine the cause of high transaction response times. The problem may be caused by any of the nodes traversed by the application and since many nodes have multiple moving parts, there are many potential trouble spots within each node. As used herein, a "node" includes servers, middle-ware, and application instances.

A simple example is a 3-tier web application: The user interacts with a browser, which in turn accesses a web server. The web server then sends a request to a back-end application server, which in turn accesses a database server. In this example, the end-user response time may be delayed by a slow web server, a slow application server, or a slow database server. The slowdown may be caused by insufficient resources such as poor CPU performance, lack of sufficient disk space on one or more of the servers, insufficient servers, not enough threads available to dispatch incoming work, or other causes.

Response times are often delayed by a single node causing a bottleneck thereby limiting overall computing performance. For example, a slow database server will cause the application server to wait which in turn will cause the web server to wait. Response times for all three nodes are affected in this example, but the root cause is the database server. A challenge for APM software is to determine the root causes of such delays. This is done by understanding relationships between all the monitoring data collected from the various systems. APM software includes transaction tracking software. Two types of data collected by transaction tracking software include resource data and interaction data. Resource data includes CPU, memory and disk usage data, etc. The interaction data provides information showing how nodes communicate to each other, which includes data detailing the timing and direction of request/response pairs.

The present invention will now be described in detail with reference to the Figures.

Figure 1:
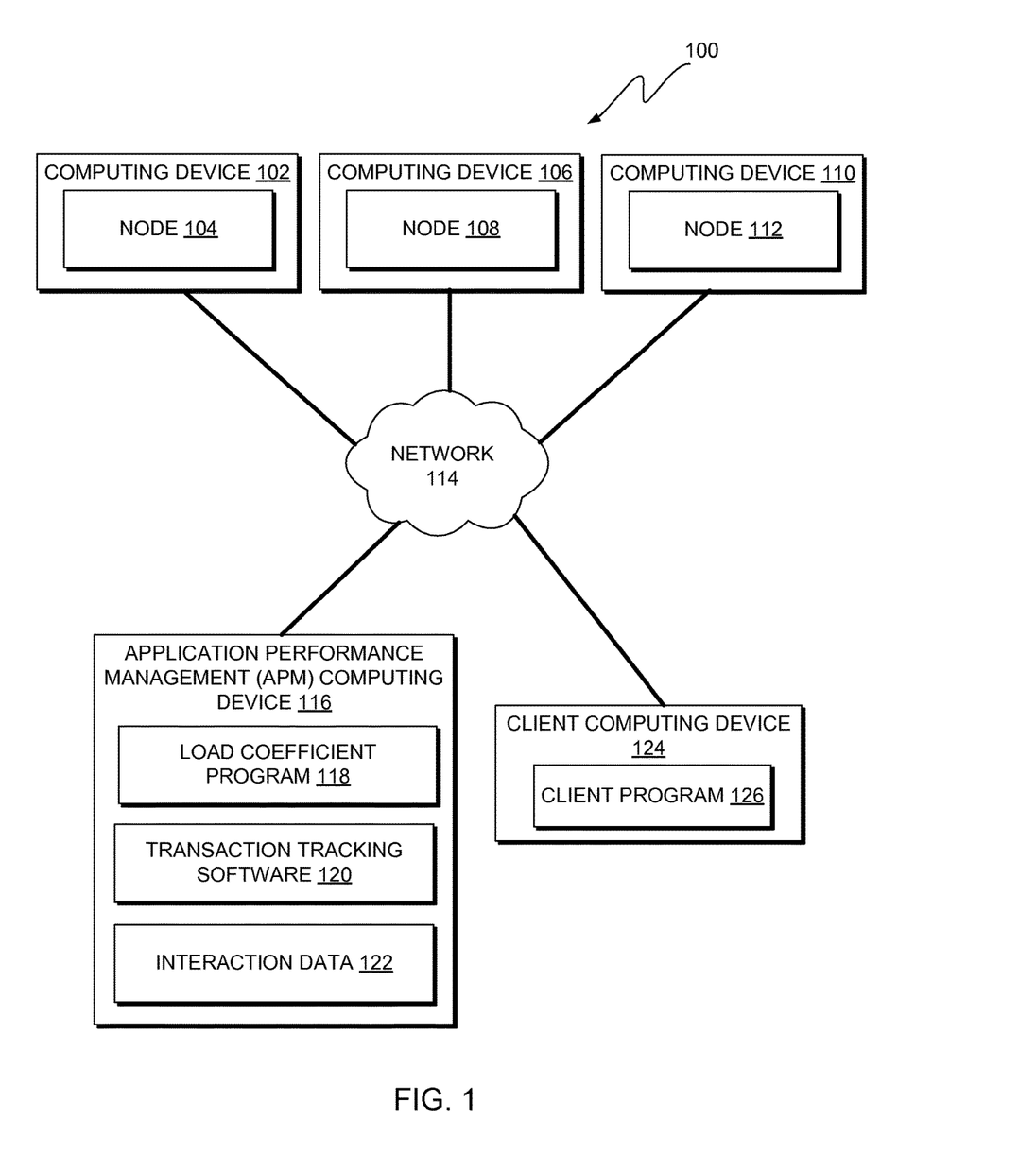
FIG. 1 is a functional block diagram illustrating a multi-threaded multi-path computing environment, in accordance with an exemplary embodiment of the present invention.

FIG. 1 is a functional block diagram illustrating a multi-threaded multi-path computing environment, generally designated 100, in accordance with one embodiment of the present invention. Computing environment 100 includes computing devices 102, 106, 110, 116, and 124 connected over network 114. Computing devices 102, 106, and 110 include nodes 104, 108, and 112, respectively. APM computing device 116 includes load coefficient program 118, transaction tracking software 120, and interaction data 122. Client computing device 124 includes client program 126.

In various embodiments of the present invention, computing devices 102, 106, 110, 116, and 124 are computing devices that can be standalone devices, servers, laptop computers, tablet computers, netbook computers, personal computers (PCs), or desktop computers. In another embodiment, computing devices 102, 106, 110, 116, and 124 represent a computing system utilizing clustered computers and components to act as a single pool of seamless resources. In general, computing devices 102, 106, 110, 116, and 124 can be any single computing device or a combination of devices with access to nodes 104, 108, and 112, transaction tracking software 120, interaction data 122 and is capable of executing load coefficient program 118 and client program 126. Computing devices 102, 106, 110, 116, and 124 may include internal and external hardware components, as depicted and described in further detail with respect to FIG. 6.

In this exemplary embodiment, software and data components of nodes 104, 108, and 112 are stored on computing devices 102, 106, and 110, respectively, load coefficient program 118, transaction tracking software 120, and interaction data 122 are stored on APM computing device 116, and client program 126 is stored on client computing device 124. However, in other embodiments, the software and data elements listed above may be stored externally and accessed through a communication network, such as network 114. Network 114 can be, for example, a local area network (LAN), a wide area network (WAN) such as the Internet, or a combination of the two, and may include wired, wireless, fiber optic or any other connection known in the art. In general, network 114 can be any combination of connections and protocols that will support communications between the software, hardware, and data components discussed above, in accordance with a desired embodiment of the present invention.

In exemplary embodiments, nodes 104, 108, and 112 include hardware, software, and data components of computing devices 102, 106, and 110, respectively. For example, nodes such as nodes 104, 108, and 112 include servers, middleware, and application instances in various embodiments. In general, nodes 104, 108, and 112 are components of one or more multi-threaded multi-path computing environments and the interactions of nodes 104, 108, and 112 when performing operations on client transactions are recorded by transaction tracking software 120 and stored into interaction data 122.

In exemplary embodiments, load coefficient program 118 retrieves timestamped data from interaction data 122 detailing the timing and number of inbound and outbound transactions that traverse nodes such as nodes 104, 108, and 112. Based on the data retrieved from interaction data 122, load coefficient program 118 calculates load coefficients for nodes such as nodes 104, 108, and 112. In various embodiments, the load coefficients calculated by load coefficient program 118 are values that range from zero to one and indicate which nodes are likely to be bottlenecks limiting computing performance. In other embodiments, the load coefficients calculated by load coefficient program 118 are percentages ranging from zero percent to one hundred percent again indicating which nodes are likely to be bottlenecks limiting computing performance. Regardless of how the load coefficients are expressed, they represent the ratio of incoming and outgoing transactions at a node for a determined time window.

In exemplary embodiments, client program 126 is an application that generates transactions, which are operated on by nodes 104, 108, and 112. As described above, one example of a client program such as client program 126 is a web browser that generates transactions to be operated on by nodes such as a web server, application server, and database server.

Figure 2:
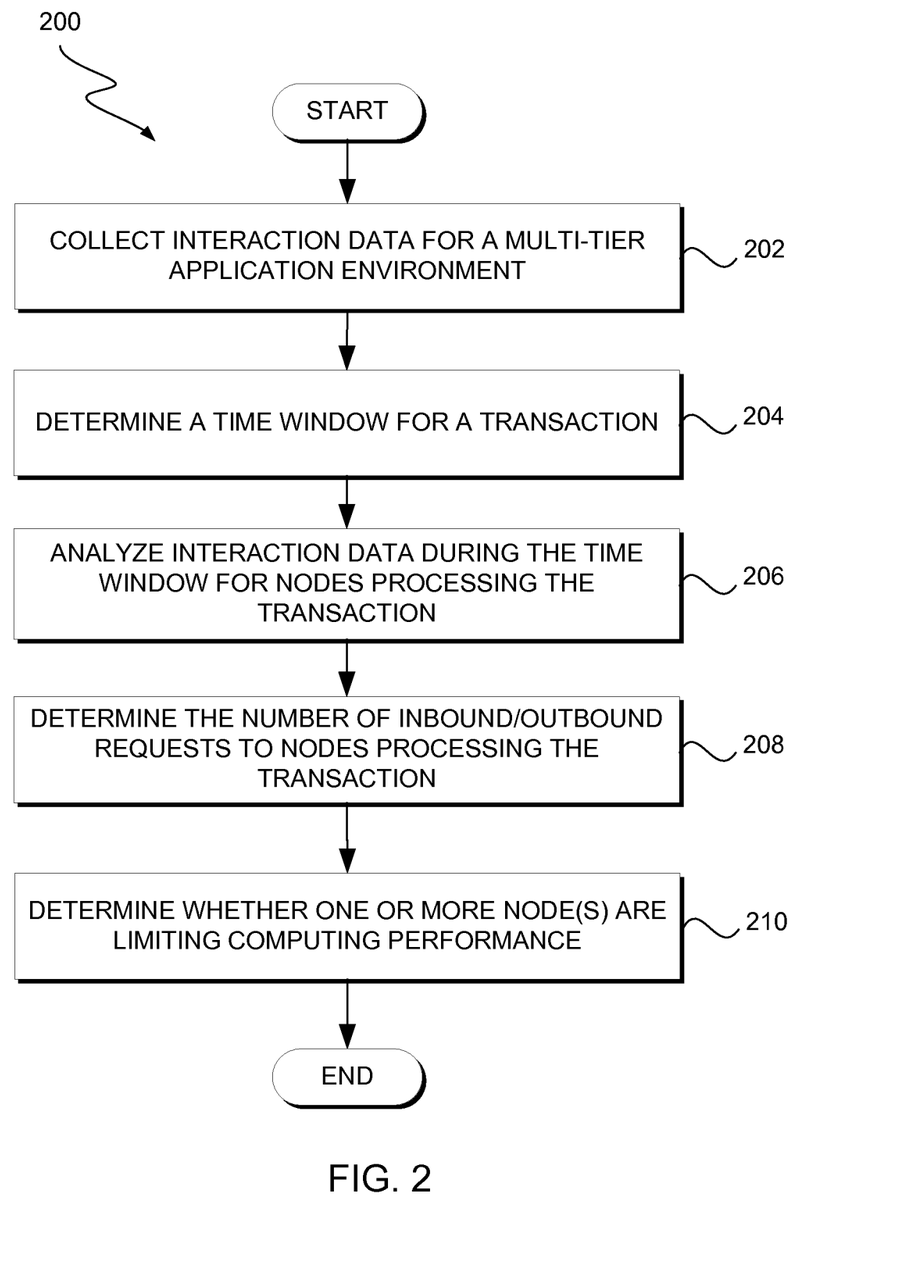
FIG. 2 illustrates operational processes for determining whether one or more nodes are limiting computing performance on one or more computing devices within the environment of FIG. 1, in accordance with an exemplary embodiment of the present invention.

FIG. 2 illustrates operational processes for determining whether one or more nodes (i.e., nodes 104, 108, and 112) are limiting computing performance on one or more computing devices (i.e., computing devices 102, 106, and 110) within the environment of FIG. 1, in accordance with an exemplary embodiment of the present invention.

In step 202, interaction data 122 is collected for nodes 104, 108, and 112 by transaction tracking software 120. Interaction data 122 includes information showing how nodes 104, 108, and 112 communicate to each other, which includes data detailing the timing and direction of transaction request/response pairs originating from client program 126.

In step 204, load coefficient program 118 determines a time window for a transaction generated by client program 126. In various embodiments, the time window for the transaction is determined based on transaction response times, which are included in interaction data 122 or otherwise obtainable from transaction tracking software 120. In other embodiments, the time window is a user-determined period of time or a standard length of time designated by hard-coded instructions within load coefficient program 118.

In step 206, load coefficient program 118 analyzes interaction data 122 for nodes 104, 108, and 112 during the time window determined in step 204. The interaction data includes the times inbound requests were received and outbound requests were sent at each node for instances of transactions originating from client program 126.

In step 208, load coefficient program 118 determines the number of inbound requests and outbound requests at each of nodes 104, 108, and 112 for instances of transactions originating from client program 126. The inbound and outbound requests are requests that are time-stamped with times that fall within the time window determined in step 204.

In step 210, load coefficient program 118 determines whether one or more of nodes 104, 108, and 112 are limiting computing performance. In various embodiments, a lower number of inbound/outbound requests at a second node relative to an immediately upstream first node indicates queuing at the second node. For each instance of a transaction, an operation is performed at each node. The inbound request occurs at the node before the operation and is time-stamped. After the operation occurs, that node sends an outbound request to the next downstream node, which is also time-stamped. An outbound request from a node signifies that the operation for which that node was responsible was successfully processed. If a downstream node has been sent more outbound requests than it has processed, then that is an indication that the downstream node is processing its operation slower than the node immediately upstream from it.

Figure 3:
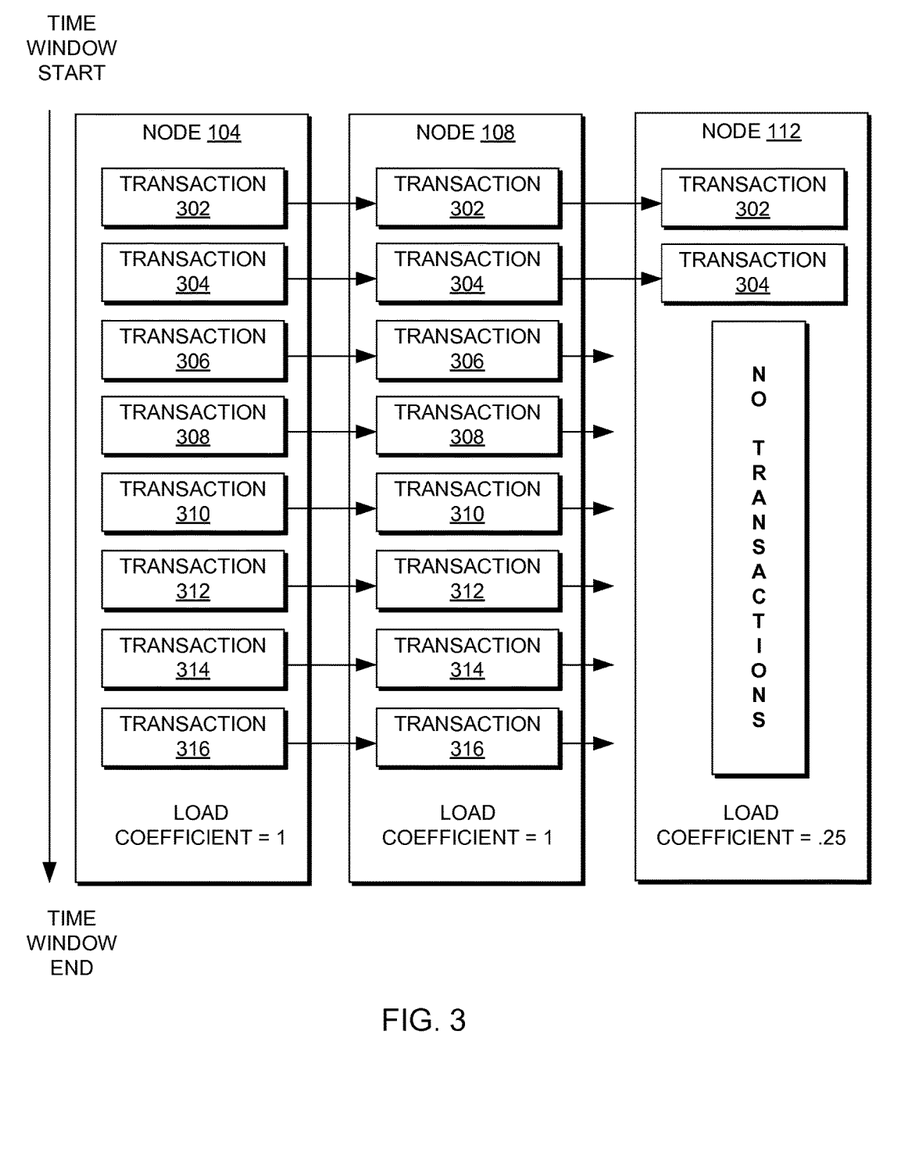
FIG. 3 depicts a first example for the determination of node load coefficients by a load coefficient program, in accordance with an exemplary embodiment of the present invention.

FIG. 3 depicts a first example for the determination of node load coefficients by load coefficient program 118, in accordance with an exemplary embodiment of the present invention.

Transactions 302-316 represent several transactions competing for the resources of nodes 104, 108, and 112. In this and subsequent examples, the transactions depicted proceed through nodes 104, 106, and 112 in succession. In this schematic, the presence of a transaction at a node indicates that the transaction has been detected inbound at the node. Thus, transactions 302 and 304 have been detected inbound by all three nodes. Transactions 306-316, however, have only been detected inbound by nodes 104 and 108 and not node 112. Transactions 306-316 have been detected outbound from node 108 (a shortened arrow only indicates outbound from the node in which the arrow originates from and a long arrow indicates outbound from the node in which the arrow originates from and inbound to the node in which the arrow terminates).

Based on the above data, load coefficient program 118 calculates load coefficients for all three nodes. In this embodiment, load coefficients are the ratio of transactions detected inbound at a node and transactions detected outbound from an immediate upstream node. In this example, node 104 is the first node encountered by the transactions so a load coefficient equal to one indicates that only eight transactions have been sent by client program 126. Node 108 has a load coefficient equal to one because all eight of the transactions detected outbound from node 104 have been detected inbound at node 108 (8/8=1). However, node 112 has a load coefficient equal to 0.25 because only two of the eight transactions that are detected outbound from node 108 are detected inbound at node 112 (2/8=0.25). This indicates that queuing of transactions 306-316 is occurring at node 112, which in turn indicates that node 112 is a bottleneck that is limiting overall computing performance.

Figure 4:
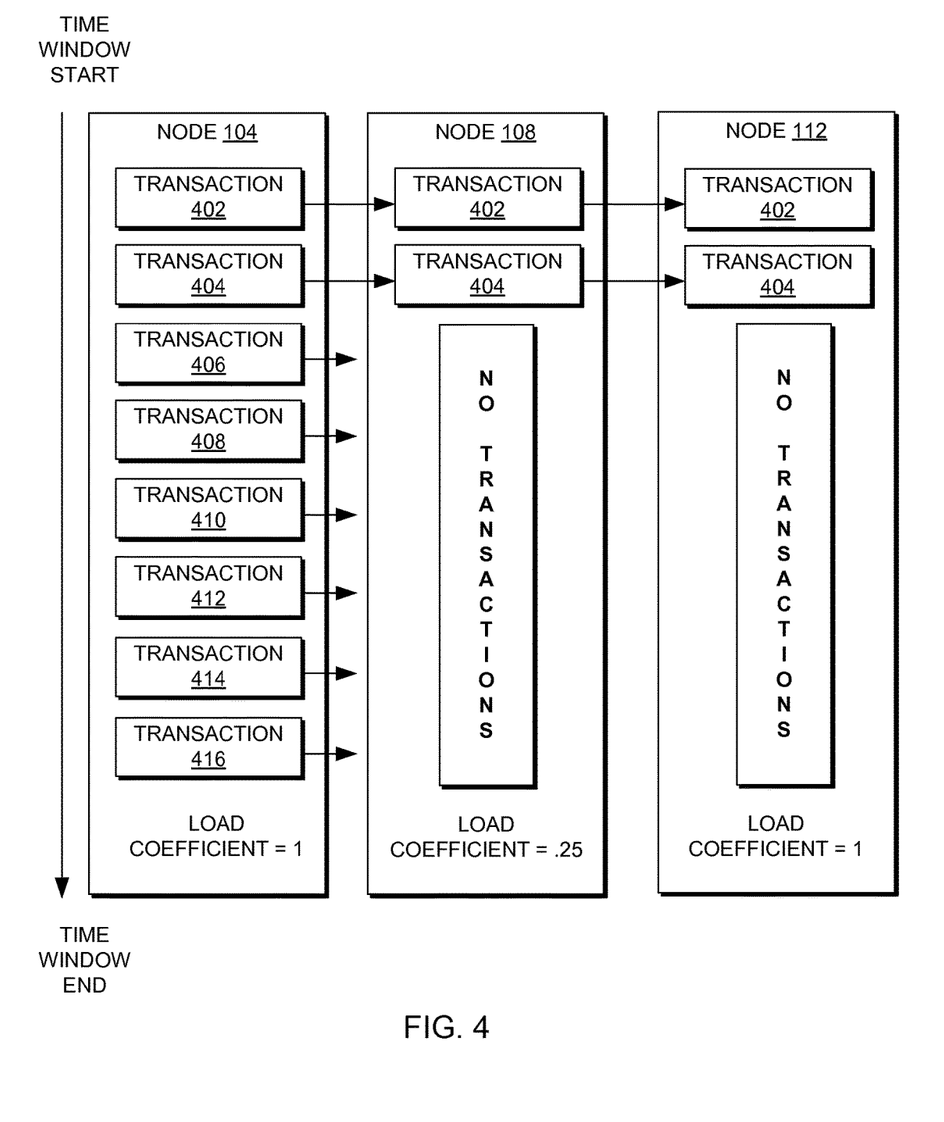
FIG. 4 depicts a second example for the determination of node load coefficients by a load coefficient program, in accordance with an exemplary embodiment of the present invention.

FIG. 4 depicts a second example for the determination of node load coefficients by load coefficient program 118, in accordance with an exemplary embodiment of the present invention.

In this example, transactions 402-416 represent several transactions competing for the resources of nodes 104, 108, and 112. Transactions 402 and 404 have been detected inbound at all three nodes. Transactions 406-416, however, have only been detected inbound at node 104, but not nodes 108 and 112.

Based on the above data, load coefficient program 118 calculates load coefficients for all three nodes. Like the previous example, node 104 is the first node encountered by the transactions so a load coefficient equal to one indicates that only eight transactions have been sent by client program 126. Node 108 has a load coefficient equal to 0.25 because only two of the eight transactions that are detected outbound from node 104 are detected inbound at node 108. This indicates that queuing of transactions 406-416 is occurring at node 108, which in turn indicates that node 108 is a bottleneck that is limiting overall computing performance. In this example, node 112 has a load coefficient equal to one because both transactions detected as outbound at node 108 are detected as inbound at node 112. This indicates that node 112 is not a bottleneck limiting overall computing performance although it says nothing regarding whether node 112 would be a bottleneck if node 108 was not a bottleneck.

Figure 5:
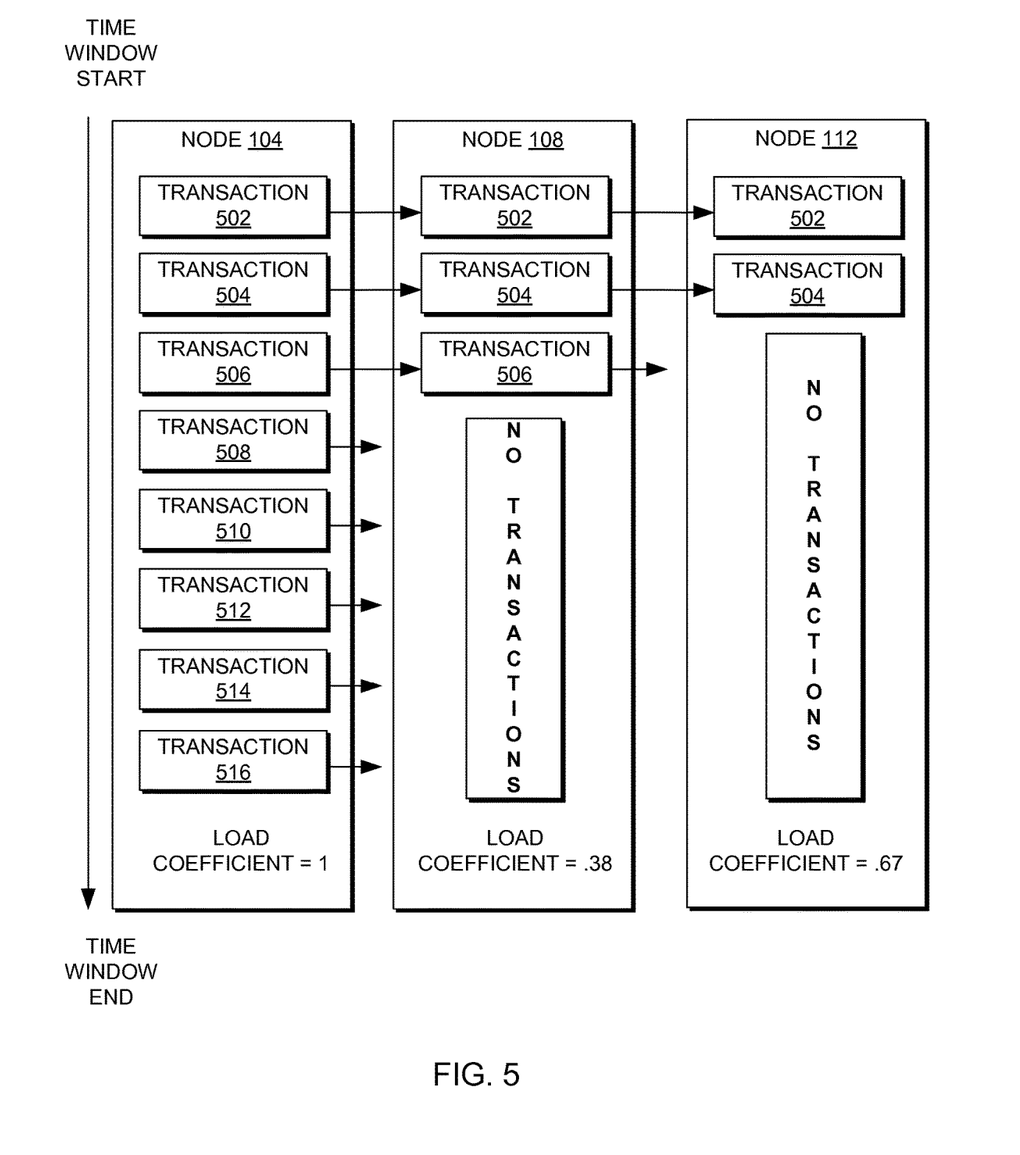
FIG. 5 depicts a third example for the determination of node load coefficients by a load coefficient program, in accordance with an exemplary embodiment of the present invention.

FIG. 5 depicts a third example for the determination of node load coefficients by load coefficient program 118, in accordance with an exemplary embodiment of the present invention.

In this example, transactions 502-516 represent several transactions competing for the resources of nodes 104, 108, and 112. Transactions 502 and 504 have been detected inbound at all three nodes. Transaction 506, however, has only been detected inbound at nodes 104 and 108, but not node 112. Further, transactions 508-516, which are detected inbound at node 104, are not detected inbound at nodes 108 and 112.

Based on the above data, load coefficient program 118 calculates load coefficients for all three nodes. Like the previous example, node 104 is the first node encountered by the transactions so a load coefficient equal to one indicates that only eight transactions have been sent by client program 126. Node 108 has a load coefficient equal to 0.38 because only three of the eight transactions that are detected outbound from node 104 are detected inbound at node 108. This indicates that queuing of transactions 508-516 is occurring at node 108, which in turn indicates that node 108 is a bottleneck that is limiting overall computing performance. In this example, node 112 has a load coefficient equal to 0.67 because only two of the three transactions detected as outbound at node 108 are detected as inbound at node 112 (2/3=0.67). This indicates that node 112 is also a bottleneck limiting overall computing performance.

It should be understood that expressing load coefficients in a range of zero to one is just one possible way of expressing this data. There are many other possible ways to express load coefficients that would be apparent to one skilled in the art. For example, load coefficients are also capable of being expressed as percentages, i.e., a load coefficient equal to one is also capable of being expressed as one hundred percent.

In various embodiments, load coefficient program 118 prioritizes nodes requiring service because of bottlenecking. In one embodiment, load coefficient program 118 prioritizes nodes for service based on the value of the corresponding load coefficients. Thus, for the example in FIG. 5, load coefficient program 118 prioritizes node 108 for service over node 112 because the load coefficient for node 108 is lower than the load coefficient for node 112 (0.38 and 0.67, respectively). In another embodiment, load coefficient program 118 prioritizes nodes for service based on the number of transactions detected inbound. Thus, for the example in FIG. 5, load coefficient program 118 prioritizes node 112 for service over node 108 because the number of inbound transactions is less for node 112 compared to node 108 (2 and 3, respectively). In yet another embodiment, load coefficient program 118 provides the raw data to a user and the user prioritizes bottlenecking nodes for service.

Figure 6:
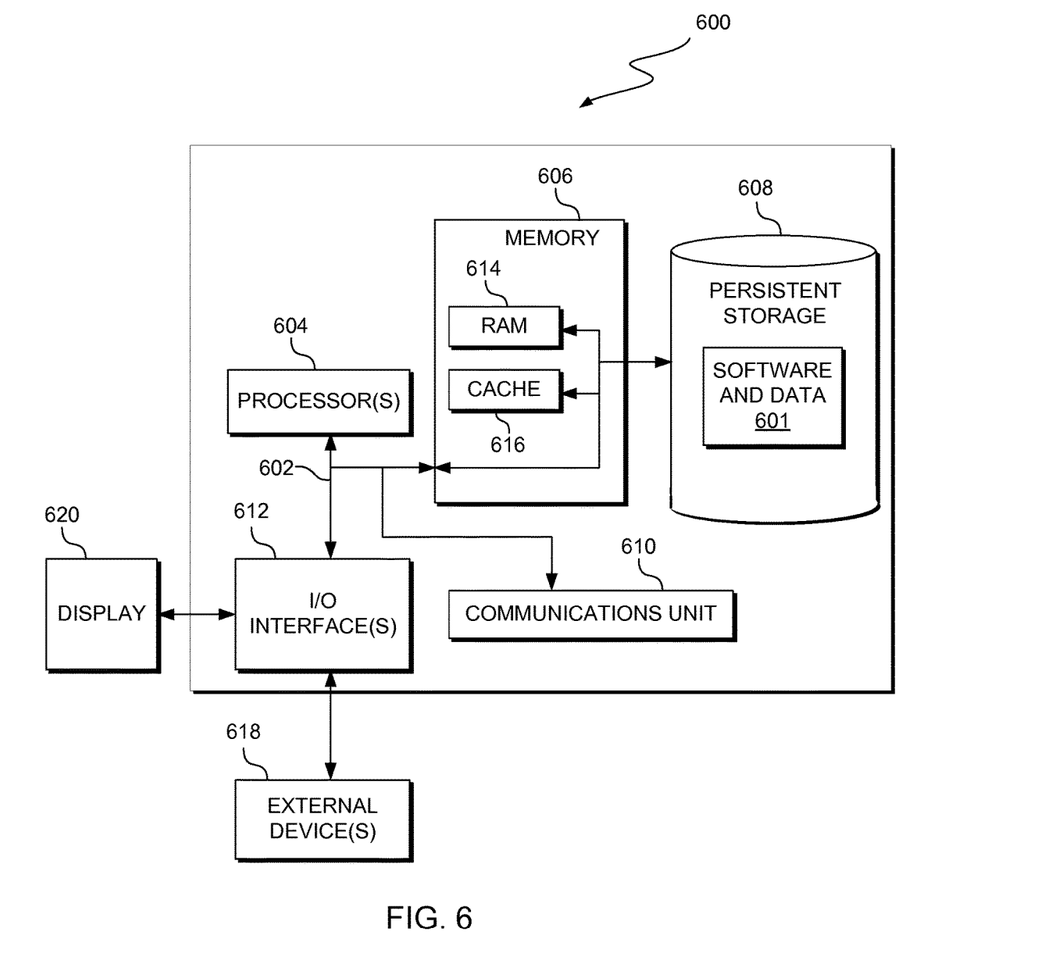
FIG. 6 depicts a block diagram of components of the computing device executing software, in accordance with an exemplary embodiment of the present invention.

FIG. 6 depicts a block diagram, 600, of components of computing devices used to practice embodiments of the present invention (e.g., computing devices 102, 106, 110, 116, and 124), in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing devices used to practice embodiments of the present invention include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Software and data 601 used to practice embodiments of the present invention (e.g., software and data components of nodes 104, 108, and 112, load coefficient program 118, transaction tracking software 120, interaction data 122, and client program 126) are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 114. In these examples, communications unit 610 includes one or more network interface cards. Communications unit 610 may provide communications through the use of either or both physical and wireless communications links. Software and data 601 used to practice embodiments of the present invention may be downloaded to persistent storage 608 through communications unit 610.

I/O interface(s) 612 allows for input and output of data with other devices that may be connected to computing devices used to practice embodiments of the present invention. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    analyzing, by one or more processors, interaction data for two or more nodes within a plurality of nodes processing a computing transaction;
    determining, by the one or more processors, a time window for a transaction, a number of inbound requests and a number of outbound requests within the time window for the two or more nodes within the plurality of nodes;
    determining, by the one or more processors, a load coefficient for the one or more nodes within the plurality of nodes, wherein the load coefficient represents a ratio of inbound requests to outbound requests and has one or both of: 1) a value less than or equal to one and greater than or equal to zero; and 2) a value less than or equal to one hundred percent and greater than or equal to zero percent; and
    determining, by the one or more processors, whether one or more nodes within the plurality of nodes are limiting computing performance based, at least in part, on the one or more nodes having one or both of: a load coefficient value less than one and a load coefficient value less than one hundred percent.

2. The method of claim 1, wherein the plurality of nodes includes one or more of: servers, middleware, and application instances.

3. The method of claim 1, wherein the plurality of nodes includes components of one or more multi-threaded multi-path computing environments.

4. The method of claim 1, wherein the plurality of nodes includes one or more of: web servers, application servers, and database servers.

5. A computer program product comprising:
    one or more non-transitory computer-readable storage media and program instructions stored on at least one of the one or more non-transitory computer-readable storage media, the program instructions comprising:
        program instructions to analyze interaction data for two or more nodes within a plurality of nodes processing a computing transaction;
        program instructions to determine a time window for a transaction, a number of inbound requests and a number of outbound requests within the time window for the two or more nodes within the plurality of nodes;
        program instructions to determine a load coefficient for the one or more nodes within the plurality of nodes, wherein the load coefficient represents a ratio of inbound requests to outbound requests and has one or both of: 1) a value less than or equal to one and greater than or equal to zero; and 2) a value less than or equal to one hundred percent and greater than or equal to zero percent; and
        program instructions to determine whether one or more nodes within the plurality of nodes are limiting computing performance based, at least in part, on the one or more nodes having one or both of: a load coefficient value less than one and a load coefficient value less than one hundred percent.

6. The computer program product of claim 5, wherein the plurality of nodes includes one or more of: servers, middleware, and application instances.

7. The computer program product of claim 5, wherein the plurality of nodes includes components of one or more multi-threaded multi-path computing environments.

8. The computer program product of claim 5, wherein the plurality of nodes includes one or more of: web servers, application servers, and database servers.

9. A computer system comprising:
    one or more computer processors;
    one or more non-transitory computer-readable storage media; and
    program instructions stored on at least one of the one or more non-transitory computer-readable storage media for execution by at least one of the one or more processors, the program instructions comprising:
        program instructions to analyze interaction data for two or more nodes within a plurality of nodes processing a computing transaction;
        program instructions to determine a time window for a transaction, a number of inbound requests and a number of outbound requests within the time window for the two or more nodes within the plurality of nodes;

program instructions to determine a load coefficient for the one or more nodes within the plurality of nodes, wherein the load coefficient represents a ratio of inbound requests to outbound requests and has one or both of: 1) a value less than or equal to one and greater than or equal to zero; and 2) a value less than or equal to one hundred percent and greater than or equal to zero percent; and program instructions to determine whether one or more nodes within the plurality of nodes are limiting computing performance based, at least in part, on the one or more nodes having one or both of: a load coefficient value less than one and a load coefficient value less than one hundred percent.

10. The computer system of claim 9, wherein the plurality of nodes includes one or more of: servers, middleware, and application instances.

11. The computer system of claim 9, wherein the plurality of nodes includes components of one or more multi-threaded multi-path computing environments.

* * * * *